March 10, 1942. R. W. MILLER 2,275,453
LOCOMOTIVE JOURNAL LUBRICATOR
Filed Oct. 19, 1939 5 Sheets-Sheet 1

Inventor
Rudolph W. Miller
By Brower & Phelps
Attorneys

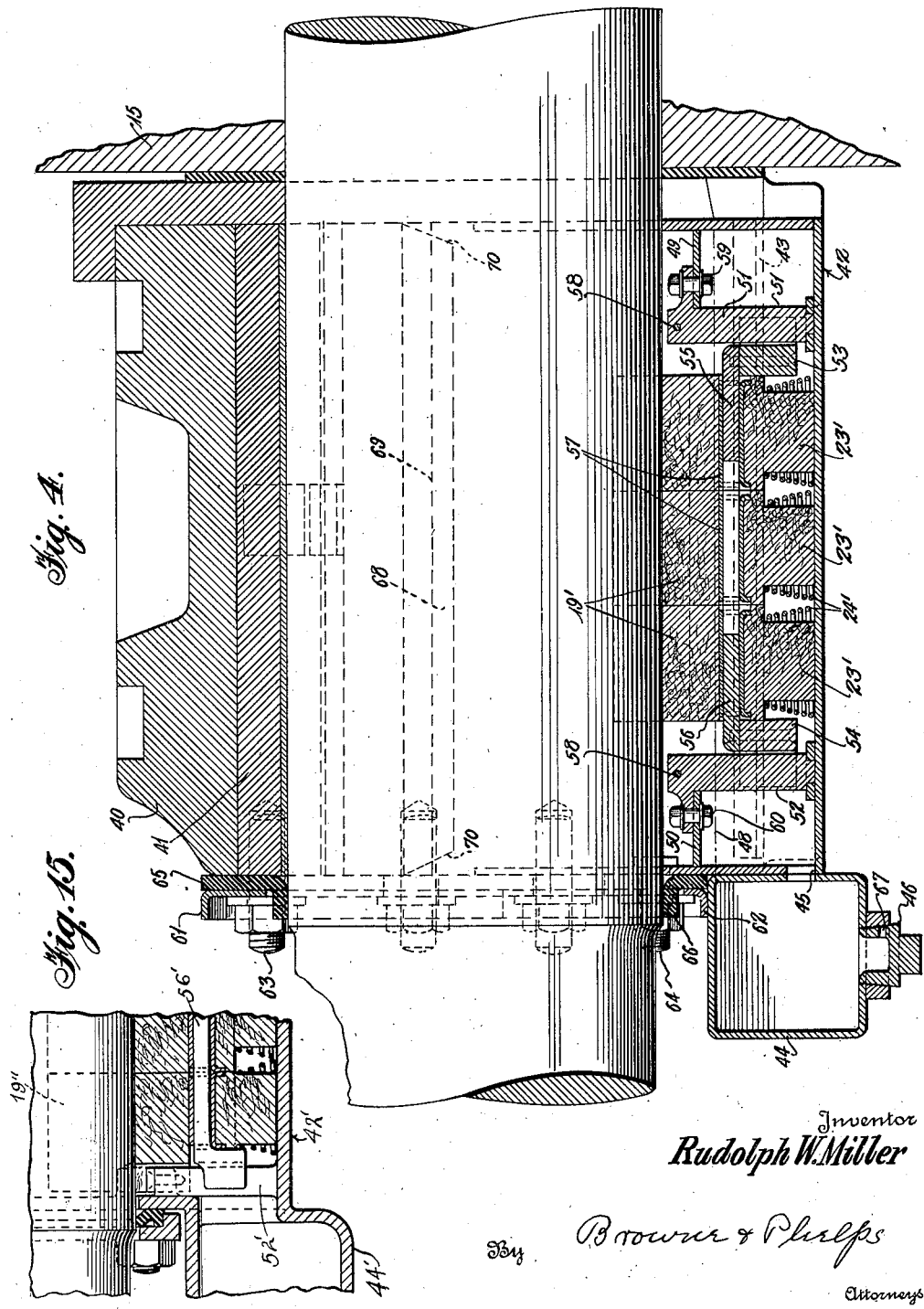

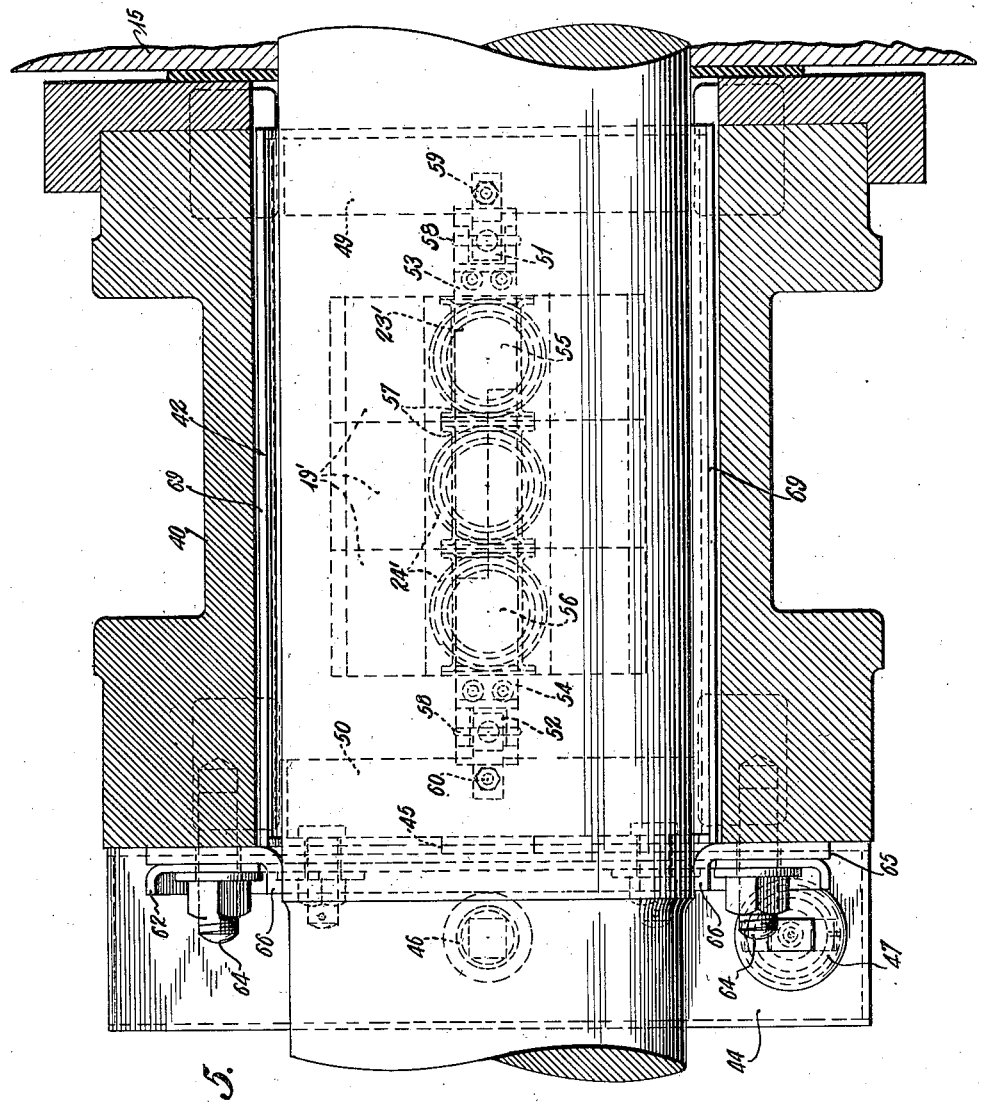

March 10, 1942.  R. W. MILLER  2,275,453
LOCOMOTIVE JOURNAL LUBRICATOR
Filed Oct. 19, 1939  5 Sheets-Sheet 4
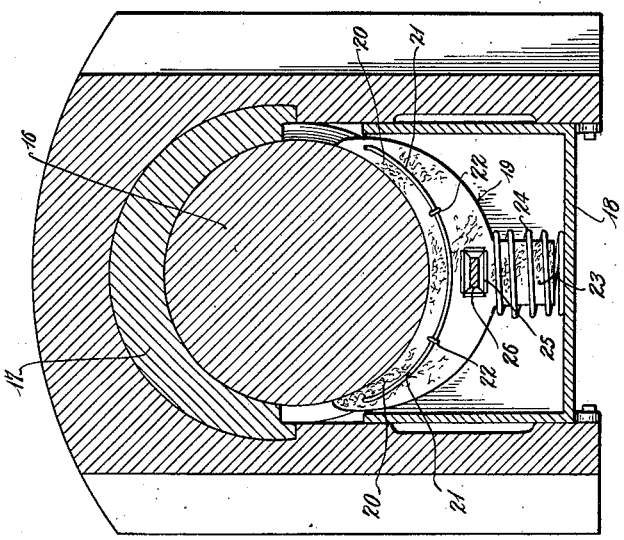
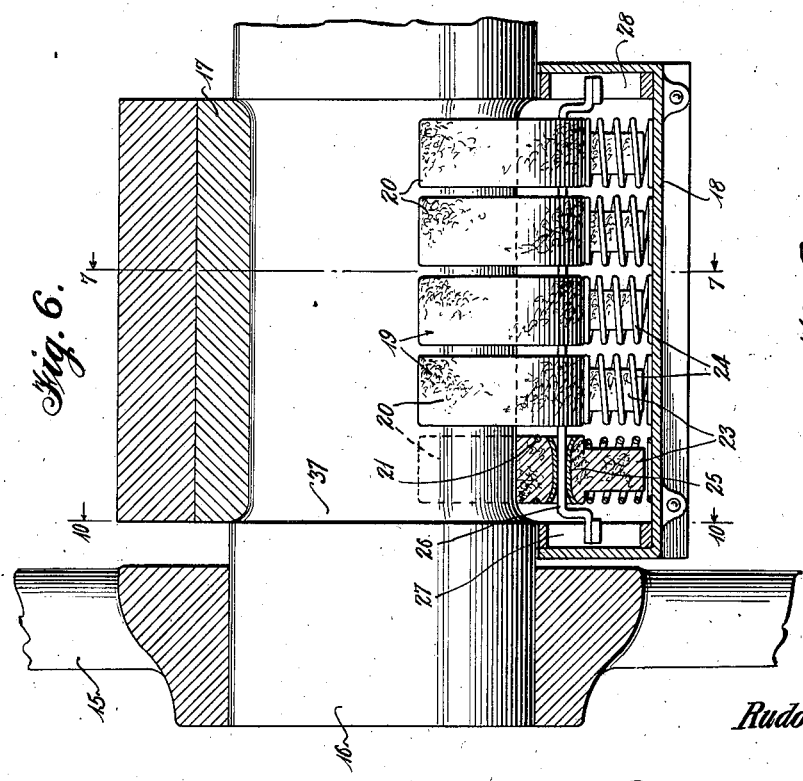
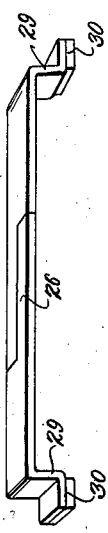
Inventor
Rudolph W. Miller
By Brown & Phelps
Attorneys March 10, 1942.  R. W. MILLER  2,275,453
LOCOMOTIVE JOURNAL LUBRICATOR
Filed Oct. 19, 1939  5 Sheets-Sheet 5
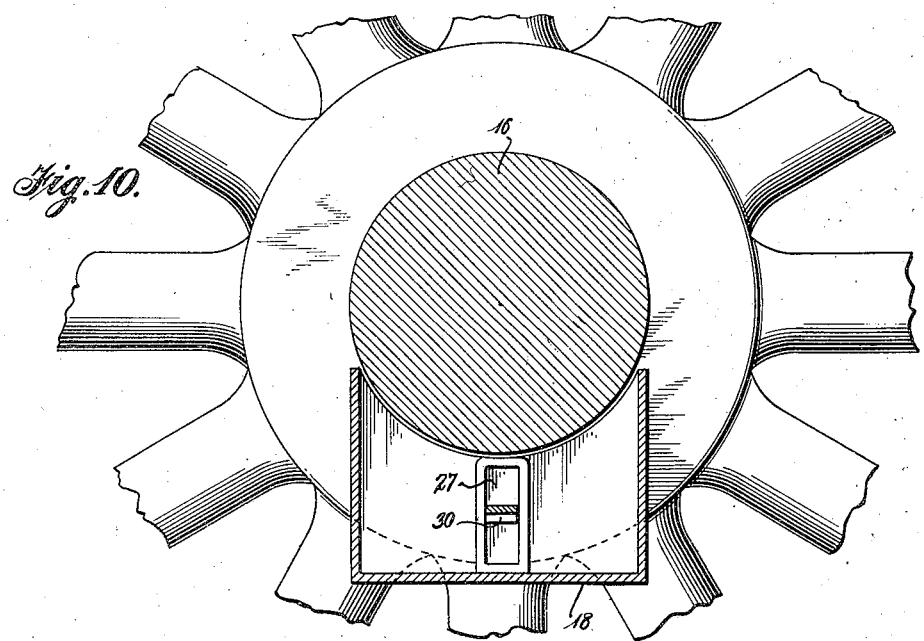
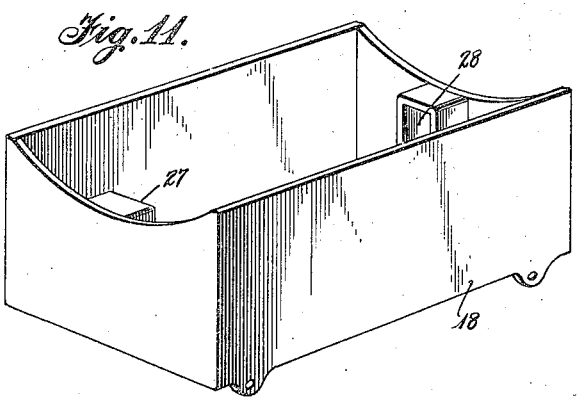
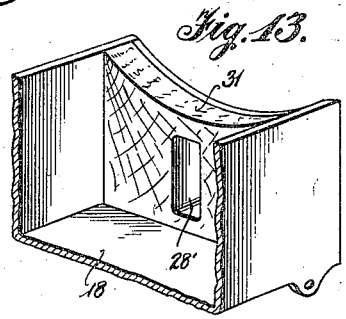
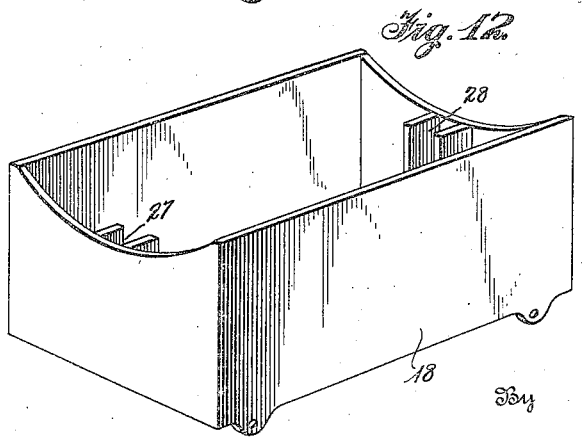
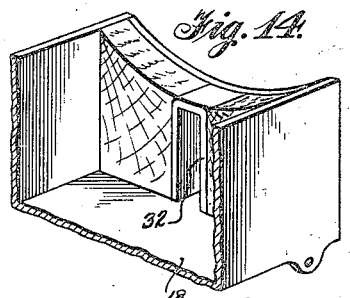
Inventor
Rudolph W. Miller
By Browne & Phelps
Attorneys Patented Mar. 10, 1942

2,275,453

UNITED STATES PATENT OFFICE 2,275,453

LOCOMOTIVE JOURNAL LUBRICATOR

Rudolph W. Miller, Winona, Minn.

Application October 19, 1939, Serial No. 300,253

8 Claims. (Cl. 308—88)

The invention relates to lubricators and has as an object a form of lubricator particularly adapted to the journals of a locomotive as distinguished from those of freight cars and railway coaches.

In the case of locomotives the cellar of the journal box is readily removable and therefore a sectional lubricator may be constructed and preassembled for insertion in the cellar.

It is an object of the present invention to provide a lubricator which may be so preassembled, placed in the cellar, and installed with the journal in this condition.

Further objects of the invention will appear from the following description when read in combination with the accompanying drawings showing illustrative embodiments of the invention, and wherein:

Fig. 4 is a central vertical section on line 4—4 of Fig. 1;

Fig. 5 is a horizontal section on line 5—5 of Fig. 1;

Fig. 6 is a central vertical section of a detail of an axle and wheel with a different form of the lubricator shown partially in side elevation and partially in central vertical section;

Fig. 7 is a transverse section on line 7—7 of Figure 6;

Figs. 8 and 9 are detail perspective views of forms of bars used with the sections of the lubricator;

Fig. 10 is a vertical transverse section on line 10—10 of Fig. 6;

Figs. 11 and 12 are perspective views of cellars having the locating means provided therein;

Figs. 13 and 14 are detail perspective views partly broken away showing one end of the cellars having a locating block placed therein; and Fig. 15 is a detail section corresponding to Fig. 4 of a different form of the invention.

Figure 1:
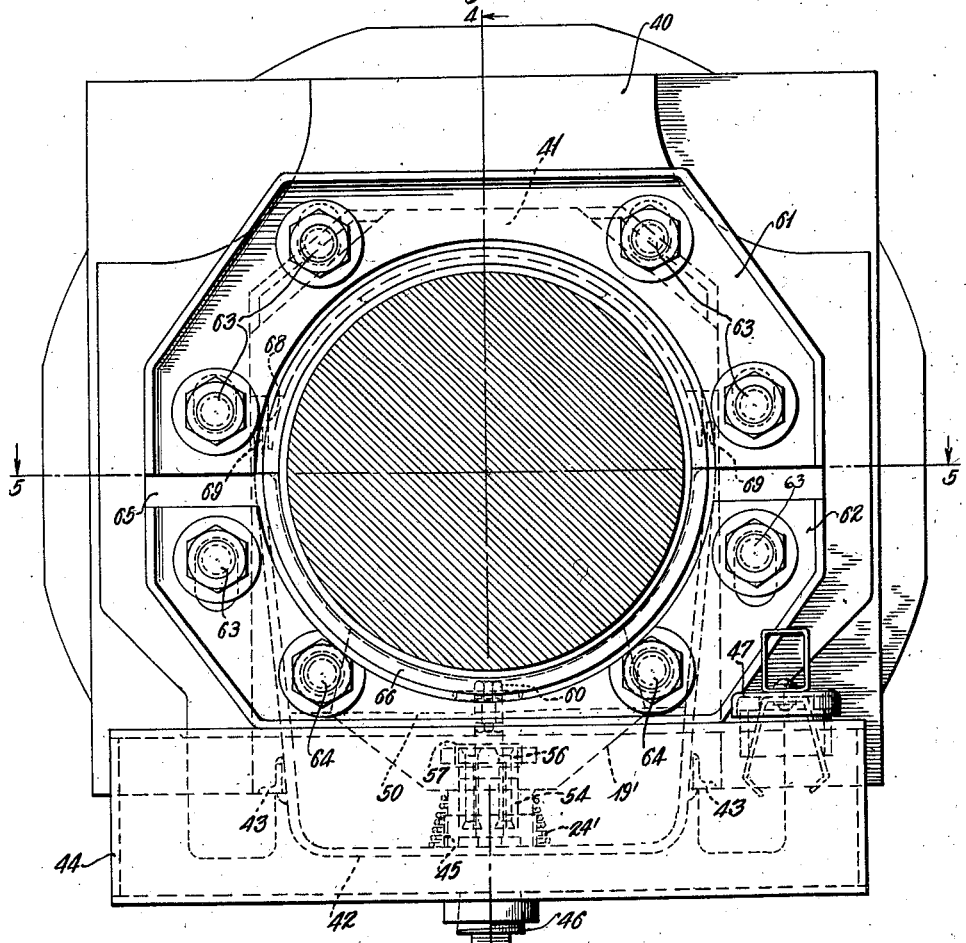
Figure 1 is an end view as seen from the left of Figure 4 showing the axle in section.
Figures 2, 3:
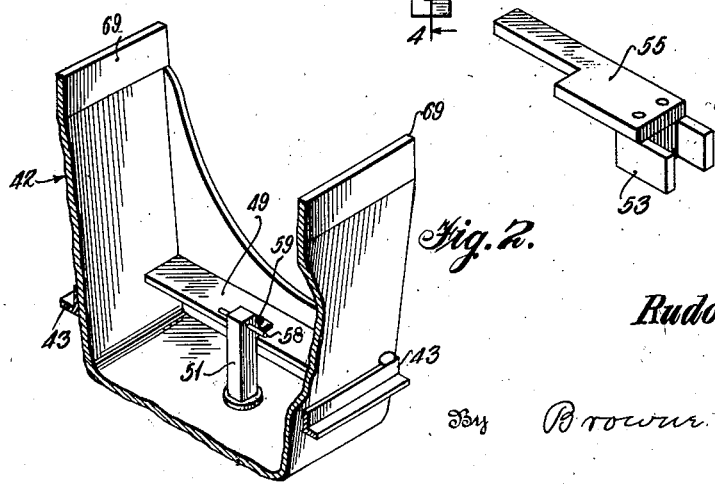
Fig. 2 is a detail perspective view of a portion of the cellar.
Fig. 3 is a detail perspective view of a portion of sectional rod used to hold the lubricator elements in alignment.

In the form of the invention shown in Figures 1 to 5 inclusive, which is at present the preferred form, the wheel of the locomotive is indicated at 15, a spring seat at 40, brasses at 41. As is usual with this type of construction a removable cellar is indicated at 42 a portion of which is shown in perspective in Figure 2. This removable cellar is shown as carrying angle members 43 to be supported upon ledges in the structure in which the bearings are carried.

The cellar 42 is shown as having rigidly secured thereto an oil reservoir 44 having an opening 45 flush with the bottom of the cellar, also a drain plug 46 and a filling opening and cap 47. The oil level in the cellar is normally carried at 48.

In the cellar are shown shelves 49, 50 to which are bolted standards 51, 52 to receive and guide slotted blocks 53, 54 having riveted thereto sections of rod means 55, 56 meeting in the bushings 57 of the lubricator elements 19'. For convenience in assembly the rod sections 55, 56 are shown as halved together as in the form indicated in Figure 3 so that they may be entered from each end of the assembled elements 19' and to lap past each other through the center element thereof.

To prevent the blocks 53 from rising out of engagement with the standards 51, 52, said standards are each shown as provided with a pin 58, one or both of which may be removed for placement of the lubricator assembly.

Each element 19' is shown as provided with a central projection 23' surrounded with a coiled spring 24'. The standards 51, 52 are shown as secured to the shelves 49, 50 by means of bolts 59, 60.

To secure the cellar in place and to seal the opening around the cellar and brass, there are shown plates 61, 62 secured to the journal box by studs 63 and to the end of the cellar by means of bolts 64, a gasket 65 being inserted and having an outturned inner margin 66 to effectuate the seal.

The plates 61, 62 and the gasket 65 are each preferably made in two parts for readiness of assembly.

The shelves 48, 49, particularly the latter, serve three functions. First, as a support for the standards 51, 52; 2d, to space the standards from the ends of the cellar, thereby shortening the overall length of the lubricator pad in order to reduce the amount of oil fed to the journal; and 3d, to assist in controlling the splash of oil toward the ends of the cellar during surges of the oil caused by motion of the locomotive.

An opening is desirably formed in plug 46 as indicated at 67. It will be seen that with port 45 flush with the bottom of the cellar, any water gathering or condensing in the bottom of the cellar will flow into the reservoir 44 and by slightly unscrewing the plug 46 the water may be drained out.

The felt elements 19' may be provided with springs as indicated at 21, Figures 6 and 7, which are not so important in the form of the invention shown in Figures 1 to 4 as in the form shown in Figures 6 and 7 because of the restricted span of the felt elements 19'.

As most clearly shown in Figure 1 the edges 68 of the brass are chamfered and the sides 69 of the cellar are caused to overlap exteriorly with the edges 68. Also the ends of the chamfered portions 68 are tapered as indicated at 70, Figure 4, the object of this chamfering, tapering and overlapping being to cause oil which escapes from the brasses to be directed back into the cellar, being an important feature of the invention for preventing loss of oil.

In Figure 6 at 15 is shown a locomotive wheel secured upon the axle 16 provided with the brasses 17 and a removable cellar 18.

The lubricator shown comprises independent sections 19 each formed with upwardly bowed arms 20 having secured thereto spring wire members 21 to hold the arms into contact with the journal. It will be understood that when saturated with oil, the arms 20 which are formed of felt will be heavy and limp and will not remain in contact with the journal in the absence of some rigid means to hold them there.

The springs 21 are desirably formed upon a normal radius of curvature less than that of the journal for the purpose and may be placed upon the opposite flat surfaces of the sections and secured thereto as by means of through-stitching 22.

The springs should not come into contact with the journal and desirably are sunk into the surface of the felt as indicated in Figure 6. Downward projections 23 of the felt are provided to dip into oil in the cellar and coil springs 24 are shown to press the sections against the journal. To preserve alignment between the sections both longitudinally and laterally, there is shown a rod 26 passing through openings in the sections, which openings are desirably lined with metal bushings 25. As shown in Figure 6, the bushings 25 are flared at their ends, which provides means for securing the bushings in the felt.

To preserve the central location of the lubricator in the cellar, there is shown in the form of Figures 6 and 7, channels 27, 28, carried in the ends of the cellar, which channels may be added to existing structures or may be cast in place in new work.

To provide for free vertical movement of the assembled lubricator, the rod 26 in Figure 6 is shown as downwardly turned at its ends at 29 and with double thickness horizontal portions 30 to coact with the slots 27, 28. For some services the bar may be made straight as shown at 26', Figure 9.

It is found that in some cases felt lubricators extending throughout the length of the wearing portion of the axle or of the journal of a railway car provides more lubrication than is desirable and introduces wear of the felt against the shoulder at the outer end of the journal or against the fillet at its inner portion. To avoid this difficulty there is shown in Figure 13 a form wherein blocks of soft material as wood 31 are used to shorten the length of the felt, which blocks may carry the slots 28' for coaction with the rod 26 or 26', as the case may be.

It may be desirable to line the slot in the wood blocks with metal as indicated at 32, Figure 14. The slots 27, 28 may be open at their top, as shown in Figure 12, or closed as shown in Figure 11.

It is to be understood that the use of wooden blocks is not confined to the structure herein shown for locomotive lubricators but may be applied to any railway journal wherein sections of lubricators are utilized.

While a spring 24 is shown with each of sections 19, it will be seen that if the rod 26 is made sufficiently rigid, springs upon only some of the sections are necessary as for instance the end sections only or the end sections and the central section with the plan shown in Figure 6.

A difficulty with lubrication having felt pads extending into contact with the rear wall of the journal box or cellar is that an objectionable amount of oil escapes to the exterior. In all forms of the invention shown, such escape is avoided, and in addition the felt is prevented from wearing on the fillet 37 of the journal.

As shown in Figure 15, the cellar 42', the reservoir 44' and the post 52' are cast integral. In order to supply more oil to the journal at the fillet and hub lines the shelves 49, 50 (one or both) may be omitted and the post 52' moved out to the end of the cellar. In addition the end felt section 19'' (one or both) may be notched or recessed as shown in Figure 15 to project past the post and the wings of the bar 56' to a position closely adjacent the end of the cellar.

Minor changes may be made in the physical embodiment of the invention within the scope of the appended claims without departing from the spirit thereof.

I claim:

1. A journal lubricator comprising, in combination: a plurality of absorptive pad sections; non-circular rod means entering said sections and extending therebetween; said sections having rod-enclosing sockets similar to said rod means in cross section whereby to prevent disalignment and rotation of said sections relative to each other; spring means to press said sections against the journal; way means rigid with and projecting a substantial distance from the rear of the journal box coacting with said rod means to guide the lubricator in vertical movements and acting to space the rearmost section from the rear wall of the journal box.

2. A journal lubricator comprising, in combination: a plurality of felt sections formed to present ends of fibers of the felt to a journal surface; said sections of upwardly open crescent shape and having overall width less than the interior width of the journal box; bowed spring means secured to the arms of the sections to hold them in contact with the surface of the journal; coiled springs reacting between the lower portions of certain of said sections and the bottom of the journal box to press the sections into contact with the surface of the journal; wick means projecting downwardly from each section to dip into oil in the box; non-circular rod means entering sockets of like cross section in the sections, extending between the sections and from at least one of the end sections to a position adjacent an end wall of the journal box; and spacing way means rigid with said end wall, coacting with said extended end of the rod means to preserve the central location of the lubricator; said spacing means coacting with said end section to space the same from said end wall to prevent escape of oil from the box resulting from excess oil applied to the journal.

3. A journal lubricator comprising: a journal box provided with vertical ways in its end portions; a lubricator comprising independent absorptive pad sections having openings therethrough; rod means passing through said openings, its ends engaging said ways for vertical movement; and means to press the sections against the journal.

4. The combination of claim 3 in which the way-engaging ends of said rod are downwardly offset from the pad-section-engaging portion thereof.

5. A locomotive journal lubricator comprising, in combination: a cellar to be removably associated with and form a portion of the journal box; a horizontal shelf at at least one end of said cellar spaced from the bottom thereof; way means adjacent each end of said cellar, that at the shelf end being secured to said shelf; absorptive pad means housed in said cellar to contact the surface of the journal; spring means to press said pad to the journal surface; rod means penetrating said pad; means carried by each end of said rod means to slidably engage the respective way means, whereby to guide and preserve the location of said absorptive pad means.

6. The structure of claim 5 in which said way means are vertical standards and the co-acting means carried by the rod means are blocks having projections lapping past the standards.

7. The structure of claim 5 in which the rod means is in parts overlapping within the body of the pad means for ease of assembly.

8. The structure of claim 5 with the pad means formed of section elements and the rod means non-circular and formed of parts overlapping within the pad means, the overlap exceeding in length the thickness of one of said section elements.

RUDOLPH W. MILLER.